United States Patent [19]

Noda

[11] 4,131,245
[45] Dec. 26, 1978

[54] FISHING REEL HAVING AN IMPROVED DRAG MECHANISM

[75] Inventor: Hideo Noda, Sakai, Japan

[73] Assignee: Shimano Industrial Company Limited, Osaka, Japan

[21] Appl. No.: 872,902

[22] Filed: Jan. 27, 1978

[30] Foreign Application Priority Data

Jan. 31, 1977 [JP] Japan .......................... 52-11065[U]
Jan. 31, 1977 [JP] Japan .......................... 52-11066[U]

[51] Int. Cl.² ............................................ A01K 89/02
[52] U.S. Cl. ......................................................... 242/217
[58] Field of Search ............... 242/217, 218, 219, 220, 242/221, 211, 212, 213, 214

[56] References Cited

U.S. PATENT DOCUMENTS

| 3,146,966 | 9/1964 | Dunn | 242/219 |
| 3,425,644 | 2/1969 | Griste | 242/221 |
| 3,432,114 | 3/1969 | Meisner | 242/214 |
| 3,799,472 | 3/1974 | Svensson | 242/217 |

*Primary Examiner*—George F. Mautz
*Attorney, Agent, or Firm*—Stevens, Davis, Miller & Mosher

[57] ABSTRACT

A fishing reel having a spool rotatably and axially movable with respect to a stationary support spindle is provided with a friction plate mounted to the spool, a drag plate fixed to the spindle and located adjacent the friction plate, and a control mechanism for axially moving the spool to bring the friction plate into contact with the drag plate.

10 Claims, 4 Drawing Figures

FISHING REEL HAVING AN IMPROVED DRAG MECHANISM

BACKGROUND OF THE INVENTION

This invention relates to a fishing reel, and, more particularly, to a fishing reel having a spool rotatably supported by a double bearing assembly to a spindle journaled between a pair of spaced apart housings. A crank handle forcibly rotates the spool by rotating the spindle which is coupled to the spool by a torque transmission. Thus, rotation of the crank handle winds the fishing line onto the spool. When a sufficient pulling force is applied to the line (as when a fish is hooked), the torque transmission allows the spool to slip and temporarily free itself from a positive mechanical coupling with the crank handle thereby permitting the rotation of the spool in a direction opposite to that which occurs when the handle is rotated to wind the line. The torque transmission is also adapted to allow the spool to become freely rotatable by being mechanically disconnected from the crank handle so that casting can be effected.

The prior art torque transmission includes a friction plate mounted at the outer lateral side of one of the spool flanges and an associated drag plate mounted at one end of the spindle on the inward side of one of the housings to face the friction plate. The drag plate is not axially movable but rotates integrally with the spindle. With this construction the spindle is axially moved to shift the spool and consequently the friction plate into contact with the drag plate. As a result, the driving force created by turning the handle is transmitted to the spool through the master gear fixed to the handle, the pinion, spindle, drag plate and friction plate. If a sufficient resistance is encountered in winding up the line than can be handled by the coupling between the drag and friction plate (as when a fish is on the line), the friction plate slides relative to the drag plate thereby idling the handle and the spool is reversely rotated. As noted, this construction also allows the spindle and thus the spool to be axially moved to separate the friction plate from the drag plate, so that the spool may freely rotate by being mechanically disconnected from the handle.

As is readily apparent, the optimum operation of the torque transmission occurs when the friction and drag plates are brought into surface to surface contact with one another, i.e., each plate is in a plane parallel to that of the other. However, the mounting of the drag plate to one of the reel housings creates problems in that the drag plate may not always be perfectly aligned with respect to the spool carried friction plate. Alignment errors can arise in the support mechanism which couples the drag plate to one of the housings and these errors can be further compounded by alignment errors caused when the two housings are assembled. Because of these alignment errors the friction plate will not uniformly contact the entire surface area of drag plate and the slantwise contacting plates will cause the fishing line to be drawn out under non-uniform resistance, i.e., unsmoothly. In addition, the friction and drag plates will become partially and unevenly worn.

Another problem associated with the above described apparatus is that the spindle is insertably supported in the drag plate and is axially moved with respect thereto within a very small supporting length. With this construction, the spindle can be easily twisted during movement causing a relatively slow and unreliable engagement of the dragging operation.

The present invention has been designed to solve the foregoing problems. Accordingly, one object of the invention is the provision of a fishing reel capable of continuously and smoothly drawing out the fishing line from the spool. Another object of the invention is the prevention of uneven wearing of the friction and drag plates which comprise the torque transmission of a fishing reel. Yet a third object of the invention is the provision of a mechanism for quickly and reliably engaging the dragging operation.

The fishing reel constructed in accordance with the teachings of the invention, has the spool supported to a stationary spindle such that the spool is axially movable as well as rotatable with respect to the spindle. The spool contains a trunk having flanges on its opposite ends. The friction plate is mounted on one of the flanges and is normal to the axis of the spindle. The trunk of the spool extends lengthwise over a pair of bearing means disposed along the length of the spindle. The bearing means support the spool to the spindle while permitting the above described rotatable and axial movement of the spool. The drag plate is fixed to the spindle and properly positioned normal to the axis of the spindle so that the spool may be axially moved to allow the friction plate to contact the drag plate. Because the drag plate is fixed to the spindle and the friction plate moves with the spool, the contact between the two plates is always uniform over the entire surface area of the friction plate. Hence the dragging operation is always reliably and smoothly effected and the friction and drag plates are prevented from being partially worn. Moreover, the spindle no longer axially moves relative to the drag plate, thereby eliminating any possibility of rough engagement of the two.

These and other objects, features, and advantages of the invention will become more apparent upon a reading of the following detailed description of the invention in conjunction with the accompanying drawings.

DETAILED DESCRIPTION OF A PREFERRED CONSTRUCTION

Figure 1:
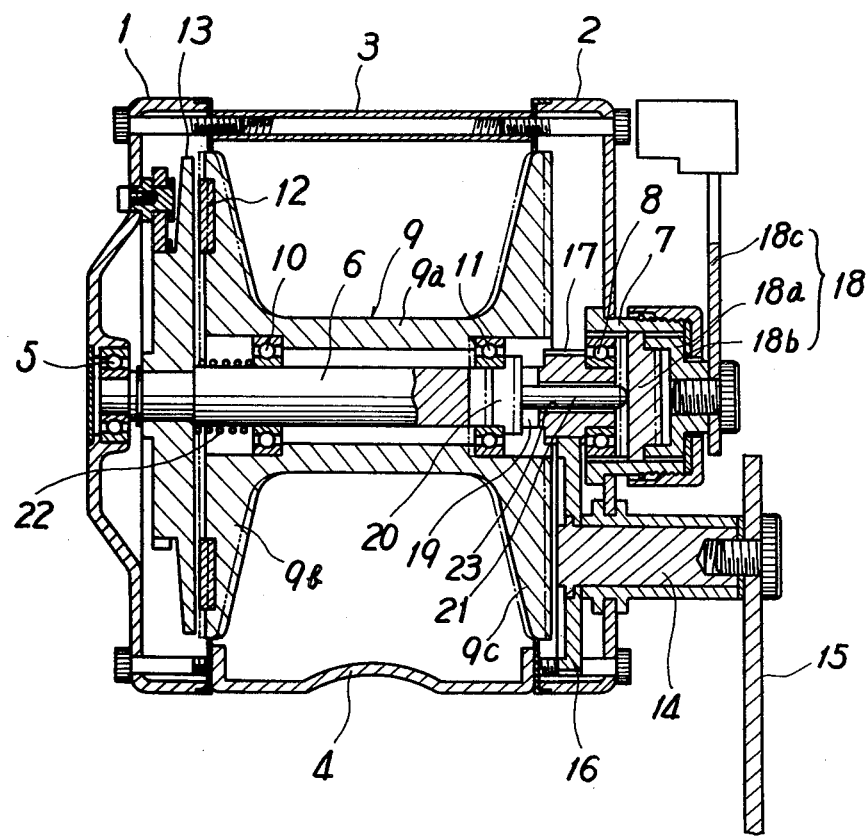
FIG. 1 is a sectional view of the first embodiment of the invention showing the disengaged drag and friction plates.
Figure 2:
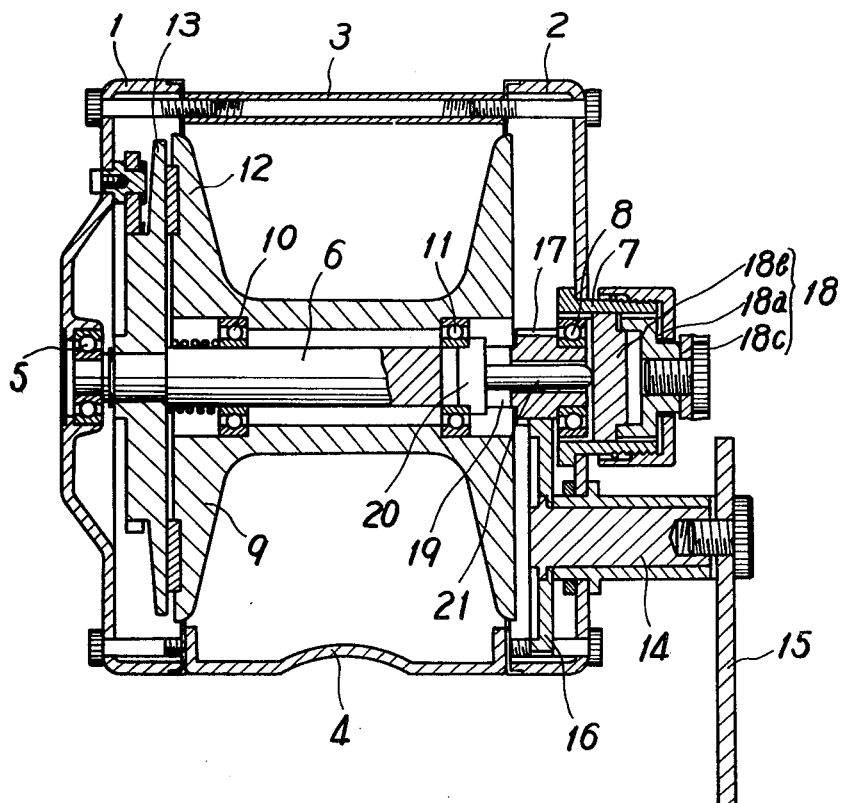
FIG. 2 is a sectional view of the first embodiment of the invention showing the engaged drag and friction plages.

Referring to FIGS. 1 and 2, the reference numerals 1 and 2 designate opposite housings uniformly spaced from each other. Housings 1 and 2 are connected by a plurality of rods 9 and a mounting leg 4 through which the reel is mounted to a fishing rod. A spindle 6 is journaled between the opposite housings 1 and 2 in such a manner that one end of the spindle is rotatably supported to housing 1 through bearing means 5 and the other end is similarly supported to the housing 2 through bearing means 8 which is located in a cap 7.

A spool 9 rotatably and axially movable is supported to the spindle 6 through two bearing means 10 and 11 and comprises a trunk 9a and flanges 9b and 9c, extending radially of the trunk 9a from both axial ends thereof, the flange 9b having a friction plate 12 fixed to its lateral side. The bearing means 10 and 11, which consist mainly of ball bearings, are inserted between the inner periphery of the trunk 9a and the outer periphery of the spindle 6, respectively, and are axially spaced at a desired interval. The outer races of the bearings are fixed to the inner surface of trunk 9a and the inner races are slidable with respect to the spindle 6, whereby the bearing means 10 and 11 are axially movable along with the spool 9.

Reference numeral 13 designates a drag plate having a disc-like shape which is fixed to one end of the spindle 6 at a side of the housing 1. As illustrated, the drag plate is mounted such that one side is opposite to the friction plate 12 of the spool 9. When spool 9 is axially moved, the friction plate 12 is brought into contact with the drag plate 13 so that spindle rotation is frictionally transmitted via the drag and friction plates to the spool 9; that is, drag plate 13 and friction plate 12 constitute a drag mechanism.

The spindle 6 is, as is well known, rotated by turning a crank handle 15. The crank handle 15 is fixed to a handle shaft 14 which in turn is rotatably supported to the housing 2 and has a master gear 16 secured to one axial end thereof projecting inwardly of the housing 2. The master gear 16 meshes with a pinion 17 mounted to the spindle 6, through which the driving force created by turning the crank handle 15 is transmitted to the spindle 6.

A control mechanism is provided for moving the spool 9 axially of the spindle 6 so as to control the transmission of driving force from the drag mechanism to the spool 9.

The control mechanism employs a cam-and-follower mechanism 18 composed mainly of a cam 18a, a follower 18b and a control lever 18c. The spool 9 is normally biased toward the cam-and-follower mechanism 18 by means of a spring 22. The control lever 18c is rotated in one direction to move the spool 9 against spring 22 to bring the friction plate 12 into contact with the drag plate 13, and is rotated in an opposite direction to allow the spool 9 to be moved by the force of spring 22, thereby uncoupling the friction and drag plates from each other.

As further illustrated in FIG. 1, the control mechanism employs a pusher 20 associated with the cam follower which pushes the spool 9 toward the drag plate 13 against the force of spring 22. The cam 18a and follower 18b are arranged within the cap 7 so that the cam 18a is rotatable but not axially movable with respect to the cap 7 while the follower 18b is axially movable but not rotatable with respect to the cap. Cam 18a has a center portion which projects outwardly from the cap 7 and which carries thereon the control lever 18c.

Figure 3:
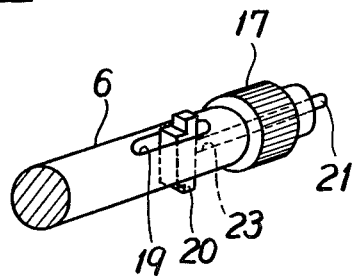
FIG. 3 is a perspective view of a part of spindle of the FIG. 1 embodiment; and, FIG. 4 is a sectional view of a second embodiment of the invention.

The pusher 20 is of a rod-like shape and is respectively engaged with bearing means 11 or the inner race of the ball bearing and a push rod 21 which engages with the follower 18b for operation in association therewith. The mounting of the pusher 20 and push rod 21 is better illustrated in FIG. 3 which shows a slot 19 and a through-bore 23 communicating therewith which opens at the end face of the spindle 6 nearest the cam mechanism. The pusher 20 is inserted into the slot 19 and interconnected push rod 21 is inserted into the throughbore 23; both pusher 20 and push rod 21 are axially movable.

The operation of the above described reel is as follows. To wind up the fishing line cam 18a is rotated by the lever 18c to move the follower 18b away from the cam 18a, i.e., leftwardly from the position shown in FIG. 1. This causes spool 9 to be moved leftward against the force of spring 22 by means of push rod 21, pusher 20 and bearing means 11. Accordingly, friction plate 12 associated with spool 9 is pressed into contact with drag plate 13. This is illustrated in FIG. 2. As a result, the crank handle 15 may be turned to transmit a driving force to the spool through master gear 16, pinion 17, spindle 6, drag plate 13 and friction plate 12. When a sufficient pulling force is applied to the line wound on spool 9, as when a fish is hooked, friction plate 12 slides with respect to the drag plate 13, resulting in idling of the handle 15 and the reverse rotation of the spool. Thus, fishing line is withdrawn from the spool.

When casting of the line is desired, lever 18c rotates cam 18a to move the follower 18b toward cam 18a or rightwardly of the position shown in FIG. 2. This operation allows the force of spring 22 to restore spool 9 to its FIG. 1 position. Accordingly, friction plate 12 is separated from the drag plate 13 and the spool 9 is disconnected from the spindle 6, thereby allowing the line to be drawn out smoothly without any resistence to the free rotation of spool 9.

The pusher 20 combined with the push rod 21, as shown in FIGS. 1 and 2 may be replaced by a modified pinion 17 providing the same functions as pusher 20 and push rod 21. This modification is shown in FIG. 4.

Figure 4:
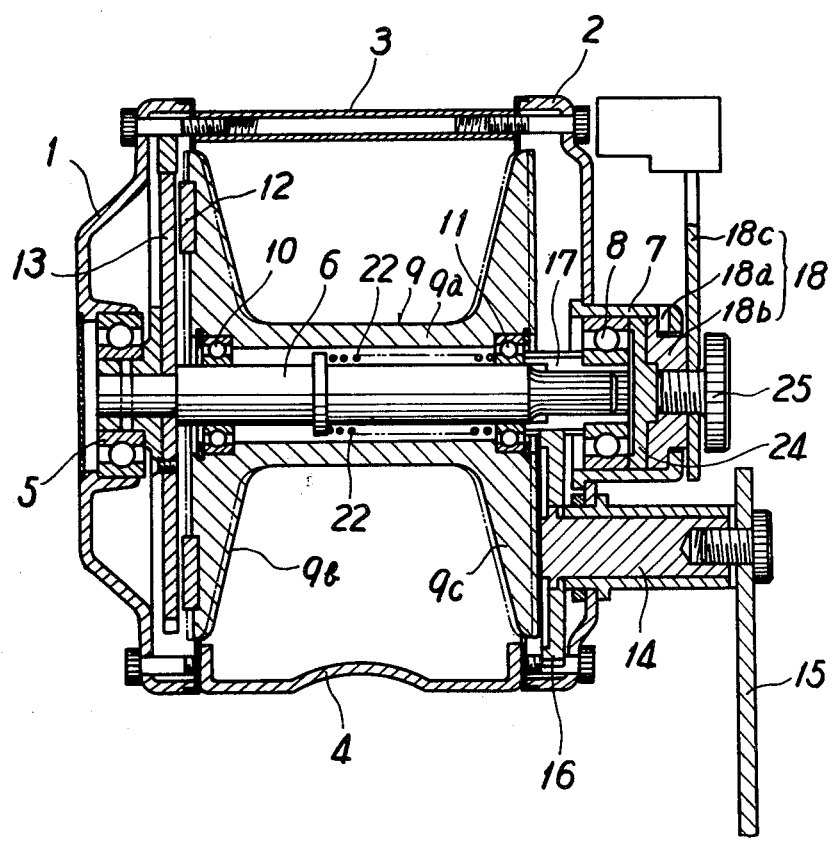

As illustrated in FIG. 4, pinion 17 connected with the spindle 6 through an axially movable spline is supported at one end by bearing means 8 which is movably mounted with respect to the cap 7 and is engaged at the other end with bearing means 11 of spool 9.

In the cam mechanism shown in FIG. 4, cam 18a formed of a pin is fixed to the cap 7, and the follower 18b is supported within cap 7 in a manner permitting rotatable and axial movement with respect to the pin. Follower 18b is attached with the control lever 18c. Reference numeral 24 designates an adjuster which contacts with an adjustment screw 25 which is screwed into follower 18b. The adjuster 24 is also in contact with the bearing means 8 so that movement of the follower 18b may be communicated to the pinion 17 through the adjuster 24 and bearing means 8.

The operation of the reel constructed as shown in FIG. 4 will now be explained.

When control lever 18c is turned to a position which causes the follower 18b to be moved leftwardly with respect to the cam 18a, the spool 9 is likewise moved leftwardly from the position shown by a solid line in FIG. 4 to that shown by a dot-dash line. The movement of spool is effected by means of adjuster 24, bearing means 8, pinion 17 and bearing means 11, and causes friction plate 12 to come into contact with the drag plate 13. Accordingly, any driving force created by turning the crank handle 15 is transmitted to the spool 9 through the master gear 16, pinion 17, spindle 6, drag plate 13 and friction plate 12, thereby rotating the spool 9 to wind up the line thereon in the same manner as described for the first embodiment of the invention.

When a sufficient pulling force is applied to the line, as when a fish is hooked, the friction plate 12 slides with respect to the drag plate 13 and the crank handle 15 remains at rest while spool 9 is reversely rotated by the line being withdrawn therefrom.

When casting is desired, follower 18b is rotated by the control lever 18c and returned rightwardly (as viewed in FIG. 4) by the force of spring 22 causing spool 9 to return to the original position shown by the solid line in FIG. 4. As a result, friction plate 12 disengages from drag plate 13 and spool 9 is disconnected from the spindle 6 becoming freely rotatable.

As can be seen from the foregoing description, the fishing reel of the invention provides a drag plate which is integrally formed with the spindle thus allowing the drag plate to be uniformly pressed into contact with the friction plate. Because both plates are accurately arranged coaxially and normally with respect to the spindle, slanting contact between them is avoided. Accordingly, the friction plate is easily slidable with respect to the drag plate resulting in a smooth withdrawal of the line from the spool and the partial wearing of the drag and friction plates is prevented. Moreover, because the spool extends over its bearing means which is slidably mounted to the spindle, the spool may be moved smoothly along the spindle to cause the engagement and disengagement of the friction plate and drag plate. With this construction, there are no twists in the axial movement of the spool and a quick and reliable engagement of the dragging mechanism can be accomplished.

The contact between the friction and drag plates is not affected by any rotation of the spool created by movement of the handle and the master gear and pinion may form a ratchet assembly.

While preferred embodiments of the invention have been described using specific terms and illustrated structures, such description is merely exemplary, and it is to be understood that changes and variations may be made to the disclosed embodiments without departing from the spirit or scope of the invention which is defined by the following claims.

What is claimed:

1. A fishing reel comprising:
    a pair of substantially parallel spaced apart housings;
    a spool spindle journaled between said housings;
    a spool having a trunk and a pair of flanges formed at opposite axial ends of said trunk;
    means for supporting said spool on said spindle such that said spool is rotatable and axially movable with respect to said spindle;
    a handle operative to rotate said spindle;
    a master gear through which said spindle is rotated by said handle;
    a drag mechanism for frictionally transmitting the rotation of said spindle to said spool; and
    a control mechanism for moving said spool axially of said spindle to control the driving force transmitted from said drag mechanism to said spool; said drag mechanism comprising: a drag plate and a friction plate, said drag plate being fixed to said spindle and normal to the axis of said spindle, said friction plate being mounted to the outer lateral surface of one of said flanges which is opposite to said drag plate, said control mechanism being operative to move said spool in one axial direction with respect to said spindle to bring said friction plate into contact with said drag plate, thereby frictionally transmitting the rotation of said handle to said spool, said control mechanism being further operative to move said spool in the other axial direction with respect to said spindle to remove said friction plate from contact with said drag plate, thereby allowing said spool to freely rotate.

2. The fishing reel as set forth in claim 1, wherein said control mechanism includes a cam mechanism comprising a cam, a follower engageable with said cam, and a control lever for controlling movement of one of said cam or said follower, said movement causing said follower to move axially with respect to said spindle, said spool being biased by a spring means toward said cam mechanism and being coupled to said follower such that said friction plate on said spool may be connected to or disconnected from said drag plate when said follower is moved by operation of said lever.

3. The fishing reel as set forth in claim 2, wherein said spindle is provided with an axially slidable pusher coupled to said follower for pushing said spool and associated friction plate toward said drag plate.

4. The fishing reel as set forth in claim 3, wherein one axial end of said spindle is located adjacent said cam mechanism and is provided with a slot and a through-bore communicating with said slot, said through-bore opening at the end face of said one axial end, said pusher being inserted into said slot and being connected with a push rod which is inserted into said bore, said rod being engaged with said follower of said cam mechanism.

5. The fishing reel as set forth in claim 3, wherein the one axial end of said spindle located adjacent said can mechanism is provided with a pinion which is engageable with said master gear, said pinion being axially movable with respect to said spindle and being engaged at its one axial end with said follower and at its other axial end with said spool, said pinion serving to couple movement of said follower to said spool.

6. The fishing reel as set forth in claim 3, wherein a cap is mounted to one of said pair of opposite housings, said one housing having said handle mounted thereon, said cap being provided with bearing means surrounding and supporting one axial end of said spindle, said bearing means being mounted adjacent said cam follower.

7. The fishing reel as set forth in claim 6, wherein said cam is formed separately from said cap and mounted for only rotative movement with respect to said cap and wherein said follower is mounted for only axial movement with respect to said cap.

8. The fishing reel as set forth in claim 6, wherein said cam is provided within said cap and said follower is formed separately from said cap, said follower being attached to said control lever and mounted for rotative and axial movement with respect to said cap.

9. The fishing reel as set forth in claim 8, wherein an adjustment mechanism for the friction between said drag and friction plates is provided between said follower and said pusher, said adjustment mechanism being adjusted by a screw inserted through said follower.

10. The fishing reel as set forth in claim 1, wherein said means for supporting said spool to said spindle comprises a ball bearing assembly, said ball bearing assembly having an outer race connected to said spool and an inner race connected to said spindle, said ball bearing assembly being axially movable with respect to said spindle.

* * * * *